F. A. BROWN.
METHOD OF CURING AND SHAPING ARTICLES OF RUBBERIZED FABRIC.
APPLICATION FILED SEPT. 14, 1920.
1,373,405.  
Patented Apr. 5, 1921.
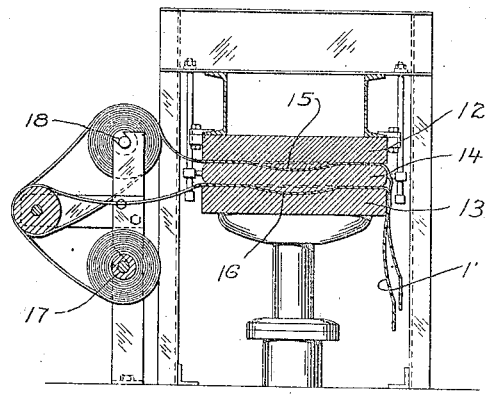
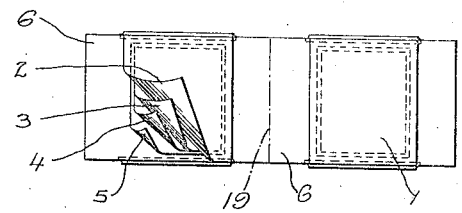
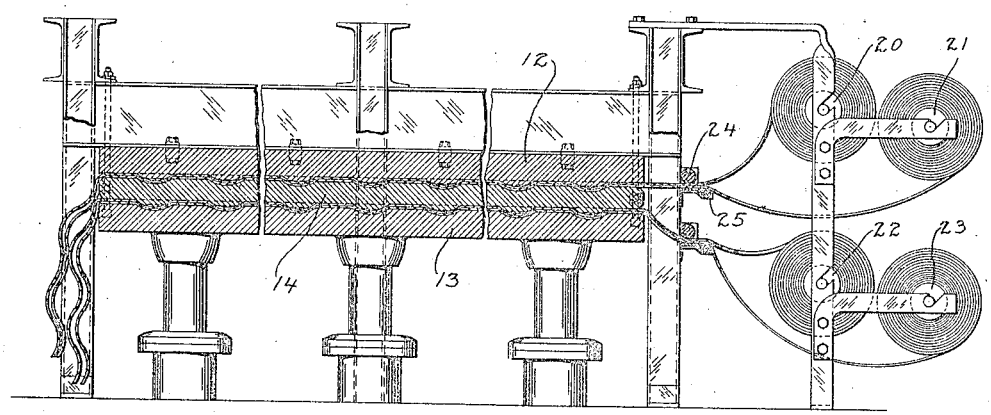
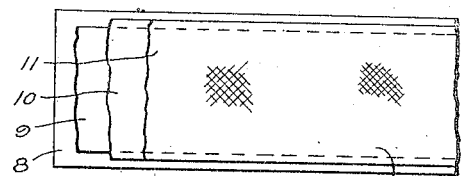
Inventor.
Frank A. Brown,
By his Attorney
Ernest Hopkinson

UNITED STATES PATENT OFFICE.

FRANK A. BROWN, OF INDIANAPOLIS, INDIANA, ASSIGNOR TO G. & J. TIRE COMPANY, A CORPORATION OF INDIANA.

METHOD OF CURING AND SHAPING ARTICLES OF RUBBERIZED FABRIC.

1,373,405.  Specification of Letters Patent.  Patented Apr. 5, 1921.

Application filed September 14, 1920. Serial No. 410,222.

*To all whom it may concern:*

Be it known that I, FRANK A. BROWN, a citizen of the United States, residing at Indianapolis, county of Marion, and State of Indiana, have invented new and useful Improvements in Methods of Curing and Shaping Articles of Rubberized Fabric, of which the following is a full, clear, and exact description.

This invention relates to a method of curing and shaping articles of rubberized fabric such as "blow out" patches, and interliners.

Patches and interliners are constructed of a plurality of plies of fabric which are coated with rubber for the two-fold purpose of enabling them to be united together firmly and given a curved shape or form adapting them to conform to the casing into which they are to be introduced to prevent the inner tube from blowing out through locally weakened portions in the carcass. The patches are of a general rectangular form in plan view and dished or saucer-shaped, while the interliners which are adapted to be positioned around the entire circumference of the casing are curved both lengthwise and crosswise.

Heretofore the patches and interliners have been cured and shaped by introducing them individually in a special form of press that has complementary projections and recesses on its opposed platens of the shape it is desired to impart to the article. In this old method of procedure the marginal portions of the articles, especially where they protrude, are frequently wrinkled by being drawn in more or less unequally. Patches and interliners cured by the old method have often to be repaired with a costly expenditure of time and labor before they are fit to be placed on the market. Furthermore, introduction of the articles in the press individually is slow and tedious and the presses are uncomfortably hot.

The present invention aims to overcome these objections by interconnecting the articles and by subjecting them to tension when and after the press platens are closed.

The invention is illustrated in the accompanying drawings, in which:

Figure 1 illustrates a suitable apparatus for curing and shaping patches, the same being a cross section through a convenient form of press;

Fig. 2 shows the method of building up patches on a strip or web and their individual construction;

Fig. 3 represents a longitudinal section through a similar press showing suitable apparatus for curing and shaping interliners; and Fig. 4 shows the laminated strip construction of interliners.

According to the present invention the patches indicated generally by the numeral 1 are built up of a number of pieces of fabric 2, 3, 4 and 5 in stacks located at intervals on a relatively thin strip of stock 6 known as the "ear ply". The latter ply is of relatively great length and the pieces of each patch are superimposed thereon in groups spaced apart at suitable intervals substantially as shown. The several pieces and their supporting web are frictioned with vulcanizable rubber composition. When the strip or ear ply 6 has been loaded throughout its length, it is passed through a wringer or other suitable pressure exerting device and dusted with soapstone. Then the strip is rolled on a reel ready for vulcanization.

The interliners 7 are made up of a plurality of strips of stock 8, 9, 10 and 11 frictioned with vulcanizable rubber composition and coated with cement on both sides excepting the widest ply 8 whose exposed outer surface is left bare. The strips forming the interliners are of relatively great length and after they have been separately frictioned and coated are separately rolled up between protecting layers of fabric or liners and carried to a plying-up machine where the rubberized plies are rolled together under pressure. The thus united plies forming the laminated strip are dusted with soapstone and wound up on rolls ready for vulcanization.

Vulcanization may be effected in any suitable press such as the Dyke press illustrated having a fixed upper platen 12 and a hydraulically movable lower platen 13. For increasing the capacity of the press it is preferred to use a pad 14 between the platens consisting of laminated felt and uncurable rubber composition made as described in my copending application, Serial No. 410,221, filed on even date herewith. The opposed faces of the platens are formed with projections and recesses 15 and 16 which are concave and convex. In the press used for making patches, the surfaces of the projections and recesses are nearly spherical, but for making interliners their surfaces are approximately ovoidal in shape.

Referring to Fig. 1 of the drawings, the interconnected series of patches on reels indicated at 17 and 18 are supported at one side of the press so that the strips can be conducted transversely through the press between its platens and the pad 14. The patches are located in the path of the projections and recesses and successively cured in the form indicated at 1' in the drawing. It is to be noticed that the protruding ends of the interconnected patches are available for tensioning, and it has been found that the overhanging previously cured strips exert enought tension on the patch that is to be cured to hold it straight and smooth during closure of the press. After a reel has been exhausted by a successive curing of the patches in this manner, they are separately sheared apart substantially midway between them as indicated at 19, Fig. 2.

The reels 20, 21, 22 and 23 of laminated sheet stock forming the uncured interliners are supported at one end of a Dyke press of generally the same construction as that used for making the patches, the only difference in the presses being that projections and cavities have more nearly ovoidal than spherical surfaces. The laminated stock with their plies 8 (whose outer surfaces are bare) opposed to one another are conducted in pairs through the length of the press on opposite sides of the central pad 14. The pairs of interliners are pulled from the press against the pressure of tension bars 24 and 25 located between the reels at the supply end of the press. The press may be of any suitable length and when the cure has been completed at one portion of the strip, the cured interlining is pulled through and an uncured portion of the stock positioned for vulcanizing. After the reels have been exhausted, the completely cured strips are cut up into lengths suitable for lining a tire casing throughout its circumference.

It has been found that the method of operations in curing patches and interliners as above described saves a great deal of time over the old method in which the articles were cured individually and eliminates practically all of the repair work that heretofore had to be done. Furthermore, the operator is not required to stand close to the press for a sufficiently long time to become uncomfortable and it is much easier to keep operatives on the work.

Having thus described my invention, what I claim and desire to protect by Letters Patent is:

1. That method of curing and shaping vulcanizable fabric reinforcing members which includes interconnecting a series of the laminated fabric members, introducing the members successively while interconnected in a press for individual curing, and vulcanizing the member.

2. That method of curing and shaping vulcanizable fabric reinforcing members for preventing locally weakened casings from blowing out and in heated presses whose platens have complementary curved projections and recesses of the desired shape to be imparted to the article which includes subjecting opposed edges of the fabric members to tension while the platens are being closed upon them, and vulcanizing the fabric members.

3. That method of curing and shaping vulcanizable fabric reinforcing members for preventing locally weakened casings from blowing out and in heated presses whose platens have complementary curved projections and recesses of the desired shape to be imparted to the article which includes interconnecting a series of the laminated fabric members, introducing the members successively while interconnected in a press for individual curing, tensioning the introduced fabric member while closing the platens thereupon, and vulcanizing the member.

Signed at Indianapolis, Indiana, this 7th day of September, 1920.

FRANK A. BROWN.